United States Patent [19]

Aso et al.

[11] Patent Number: 5,140,124
[45] Date of Patent: Aug. 18, 1992

[54] MACHINING FLUID CIRCULATING APPARATUS

[75] Inventors: Toshiyuki Aso; Toyotada Kajitori, both of Shino, Japan

[73] Assignee: Fanuc Ltd., Minamitsuru, Japan

[21] Appl. No.: 476,445

[22] PCT Filed: Aug. 31, 1989

[86] PCT No.: PCT/JP89/00898
§ 371 Date: Jun. 1, 1990
§ 102(e) Date: Jun. 1, 1990

[87] PCT Pub. No.: WO90/04478
PCT Pub. Date: Mar. 5, 1990

[30] Foreign Application Priority Data

Oct. 24, 1988 [JP] Japan .................. 63-266146

[51] Int. Cl.$^5$ ............................ B23H 1/10; B23H 7/02
[52] U.S. Cl. ............................ 219/69.12; 219/69.14
[58] Field of Search ............... 219/69.11, 69.12, 69.14

[56] References Cited

U.S. PATENT DOCUMENTS

| 4,581,513 | 4/1986 | Obara et al. | 219/69.12 |
| 4,629,854 | 12/1986 | Inoue et al. | 219/69.12 |
| 4,740,667 | 4/1988 | Obara | 219/69.12 |
| 4,833,290 | 5/1989 | Obara | 219/69.12 |
| 4,857,688 | 8/1989 | Aso et al. | 219/69.12 |

FOREIGN PATENT DOCUMENTS

| 3444607 | 6/1986 | Fed. Rep. of Germany ... 219/69.14 |
| 57-46976 | 10/1982 | Japan . |
| 293729 | 12/1986 | Japan ............... 219/69.11 |
| 62-193724 | 8/1987 | Japan . |
| 62-297031 | 12/1987 | Japan ............... 219/69.14 |
| 63-99128 | 4/1988 | Japan . |
| 63-120038 | 5/1988 | Japan ............... 219/69.14 |

Primary Examiner—Geoffrey S. Evans
Attorney, Agent, or Firm—Staas & Halsey

[57] ABSTRACT

A machining fluid circulating apparatus capable of variably controlling the amount of machining fluid supplied to an electric discharge machining region and maintaining the effective amount of the machining fluid supplied to a worktable unchanged. The amount of water which is supplied as machining fluid to the electric discharge machining region through upper and lower nozzles (15, 16), respectively communicated with pipes (32b, 32d and 32e) branching off from a pipe (32a) connected to a water tank (31) and the amount of water which is supplied to a worktable (12) through a sprinkler (35), are adjusted by a flow regulating valve (34) in the pipe (32c), in a manner inversely proportional to each other and therefore the total amount of water remains unchanged. Thus no substantial thermal deformation occurs in the worktable, thereby preventing deformation of the workpiece (40) and variation in the relative position of the workpiece and a wire electrode (50).

7 Claims, 2 Drawing Sheets

MACHINING FLUID CIRCULATING APPARATUS

TECHNICAL FIELD

The present invention relates to a machining fluid circulating apparatus for a wire cut electric discharge machine, which is capable of circulating a machining fluid between itself and a main body of the electric discharge machine while injecting the machining fluid toward both an electric discharge machining region between a wire electrode and a workpiece and those component parts of the electric discharge machine which may adversely affect the machining precision if thermally deformed.

BACKGROUND ART

In wire cut electric discharge machines where an electric discharge is produced at an electric discharge machining region between a wire electrode (hereinafter referred to as wire) and a workpiece to perform a machining operation while the wire is conveyed along a wire transport path, a machining fluid is supplied to the electric discharge machining region to remove the heat and swarf produced in the region and to establish an appropriately insulated state between the wire and the workpiece. The machining fluid is also supplied to a worktable on which the workpiece is placed, and other parts (hereinafter referred to as worktable), to cool them so that deterioration in the machining precision due to thermal deformation of the worktable can be prevented.

To this end, electric discharge machines are provided with a machining fluid circulating apparatus. Conventional machining fluid circulating apparatuses have a water tank for storing water as the machining fluid, and the water is pressurized by a pump disposed in a first pipe connected to the water tank, to be injected toward the electric discharge machining region and the worktable from a nozzle, and a sprinkler respectively connected to second and third pipes branching off from the first pipe. To allow adjusting of the amount of water supplied to the electric discharge machining region in accordance with a target machining speed and target machining precision, which are set in dependence on machining types such as rough machining, finish machining, etc., the quantity of discharge of the pump or the valve opening of a flow control valve arranged in the first pipe is adjusted.

Consequently, in response to the opening/closing of the flow control valve for controlling the amount of water supplied to the electric discharge machining region, the amount of water supplied to the worktable through the sprinkler is also varied in proportion to the amount of water supplied to the electric discharge machining region. As a result, the temperature of the worktable is varied each time the valve opening of the flow control valve is adjusted, thus causing deformation of the worktable and hence deformation of the workpiece. This results in a deviation in the electric discharge machining position. In such a case, it is difficult to carry out an electric discharge machining with the required precision. Particularly, when carrying out a rough machining and then a finish machining several times at different machining speeds to attain a machining precision of the submicron order, with the amount of water supplied to the electric discharge machining region varied to different required amounts in individual machining steps, the amount of water supplied to the worktable is varied between the machining steps and the worktable or even the workpiece may be deformed, thus causing a deviation in the machining position and making it difficult to achieve the required machining precision.

To eliminate the above inconveniences, a machining fluid circulating apparatus having independent pumps for exclusively supplying the machining fluid to the electric discharge machining region and the worktable, respectively, is conventionally used, but this type of apparatus is high in cost.

DISCLOSURE OF THE INVENTION

An object of the present invention is to provide a machining fluid circulating apparatus, which is capable of variably controlling the amount of a machining fluid supplied to an electric discharge machining region and circulating the machining fluid between itself and the main body of the electric discharge machine, while maintaining the effective amount of the machining fluid supplied to those component parts of the main body of the electric discharge machine which may adversely affect the machining precision if thermally deformed, at a constant value, and which apparatus is low in cost.

To achieve the above object, according to the present invention, there is provided a machining fluid circulating apparatus for use in a wire cut electric discharge machine in which a machining fluid is injected to an electric discharge machining region between a wire electrode and a workpiece. The machining fluid circulating apparatus comprises injecting means for injecting the machining fluid to a predetermined component part of the main body of the electric discharge machine which serves to shift the relative position of the wire electrode and the workpiece when thermally deformed, a tank for storing the machining fluid, a first pipe connected to the tank, a second pipe having both ends respectively connected to a downstream side end of the first pipe and a nozzle provided in the main body of the electric discharge machine for injecting the machining fluid to the electric discharge machining region, a third pipe having both ends respectively connected to the downstream side end of the first pipe and the injecting means, a pump disposed midway in the first pipe for pressurizing and discharging the machining fluid from the tank, and a flow regulating valve disposed midway in either one of the second and third pipes, for adjusting the amount of the machining fluid flowing through the one of the pipes.

Preferably, the predetermined component part of the main body of the electric discharge machine is supplied with the machining fluid injected from the injecting means and at least part of the machining fluid injected from the nozzle.

As described above, according to the present invention, since the flow regulating valve is provided in one of the second and third pipes branching off from the first pipe connected to the tank and respectively connected to the nozzle and the machining fluid injecting means, the amount of the machining fluid supplied from the nozzle to the electric discharge machining region can be variably controlled, and, moreover, the amount of the machining fluid which circulates within the machining fluid circulating apparatus, i.e., the total amount of the machining fluid supplied through the nozzle and the injecting means, can be maintained unchanged. Accordingly, the predetermined component part of the main body of the electric discharge machine, which is preferably supplied with the machining fluid from both the injecting means and the nozzle and which operates to shift the relative position of the wire electrode and the workpiece when thermally deformed, suffers substantially no thermal deformation. Thus, substantially no deviation occurs in the electric discharge machining position. As a result, an electric discharge machining operation can be carried out with high precision. In addition, an inexpensive machining fluid circulating apparatus can be provided since only one pump is required to supply the machining fluid.

BEST MODE OF CARRYING OUT THE INVENTION

Figure 1:
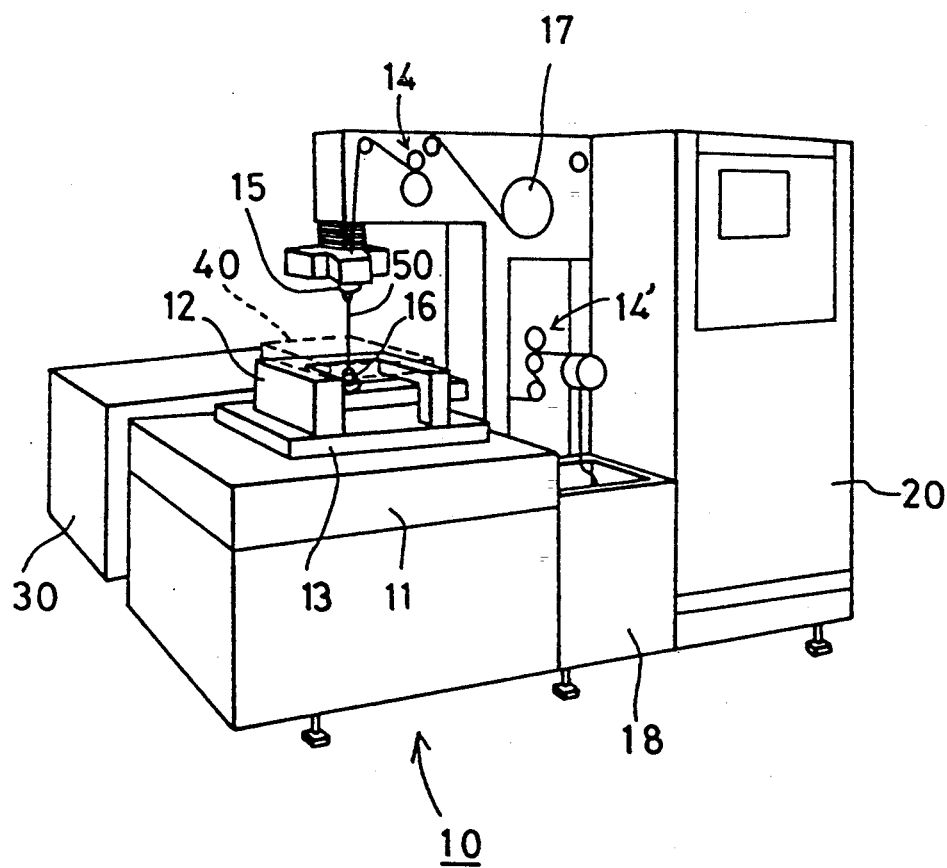
FIG. 1 is a schematic perspective view of a wire cut electric discharge machine, which is provided with a machining fluid circulating apparatus according to one embodiment of the present invention.

Referring to FIG. 1, a wire cut electric discharge machine comprises a machine body 10 of a known type, a control device 20 of a known type accommodating therein a computer for controlling the drive of the machine body 10, and a machining fluid circulating apparatus 30 according to one embodiment of the present invention, for circulating a machining fluid between itself and the machine body 10.

Specifically, the body 10 of the electric discharge machine is provided with a table 11 movable in a horizontal plane (XY plane). A worktable 12 for carrying a workpiece 40 thereon and a machining fluid pan 13 surrounding the worktable 12 are secured to the upper surface of the table 11. The machine body 10 is further provided with a conventional type wire transporting apparatus including various guide rollers, motors, and a transporting belt (some of them are shown by reference numerals 14 and 14'), whereby a wire electrode (hereinafter referred to as wire) 50 is conveyed from a wire feed reel 17 toward a wire recovery box 18 along a wire transport path passing an upper nozzle 15 and a lower nozzle 16. The machine body 10 further includes an electric discharge power supply for applying a machining pulse train between the workpiece 40 and the wire 50 to produce an electric discharge therebetween.

Figure 2:
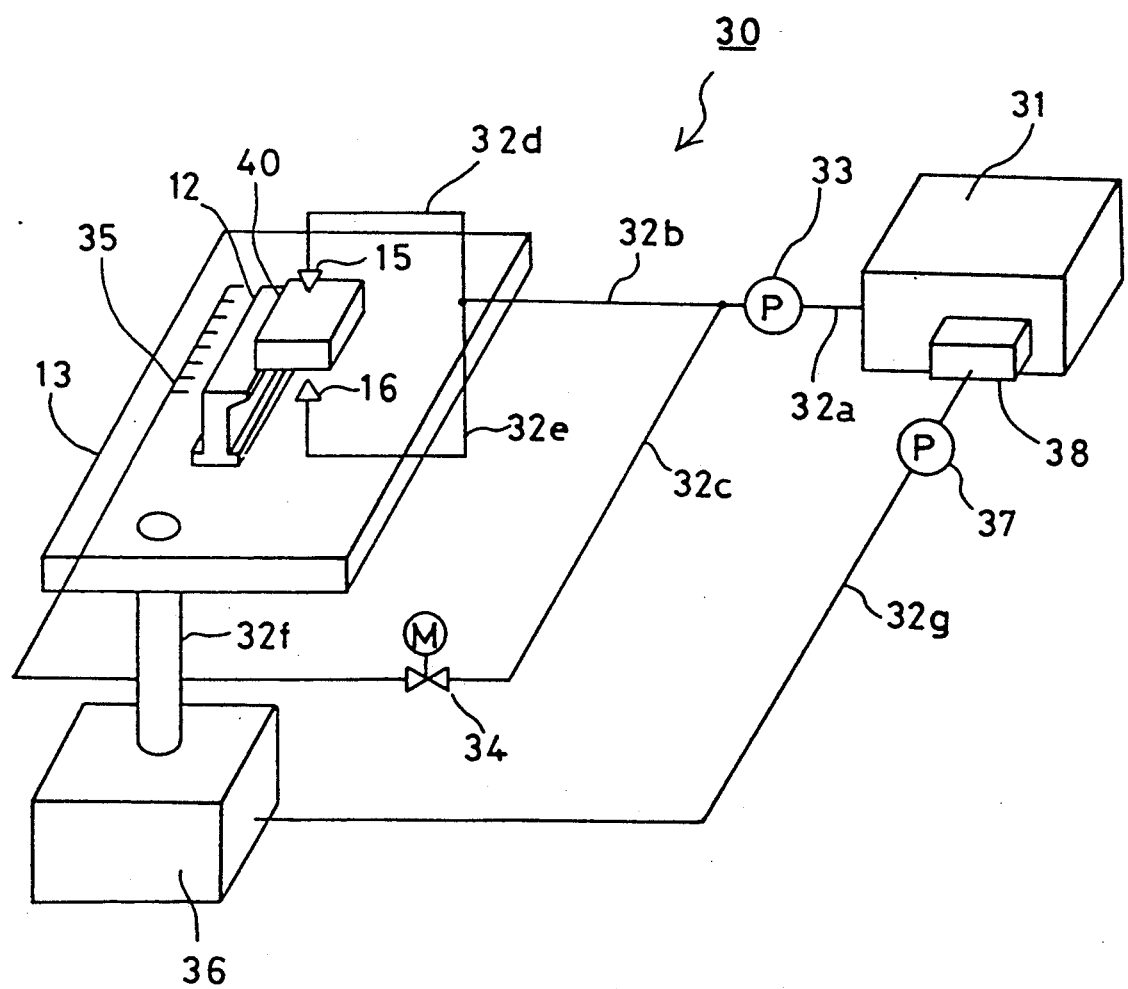
FIG. 2 is a schematic diagram illustrating the machining fluid circulating apparatus of FIG. 1 in more detail.

As shown in FIG. 2, the machining fluid circulating apparatus 30 is provided with a first water tank 31 for storing clean water as the machining fluid, to which tank the upstream side end of a first pipe 32a is connected. A first pump 33 is disposed midway in the first pipe 32a, for pressurizing and delivering water from the water tank 31. The first pipe 32a branches at the downstream side end thereof into second and third pipes 32b and 32c. The second pipe 32b further branches at a downstream side end thereof into fourth and fifth pipes 32d and 32e, the respective downstream side ends of which are connected to the upper and lower nozzles 15 and 16, respectively. An electric flow regulating valve 34 is disposed midway in the third pipe 32c for adjusting the amount of the machining fluid flowing through the pipe 32c, the downstream side end of the third pipe 32c being connected to a sprinkler 35, which constitutes injecting means, disposed in the vicinity of the worktable 12 and having the required number of injection holes for injecting clean water, as the machining fluid, toward the worktable 12 and its peripheral parts.

The machining fluid circulating apparatus 30 is disposed under the machining fluid pan 13 of the machine body 10, and is further provided with a second water tank 36 for storing the water polluted due to the electric discharge machining, the second water tank 36 being in communication with the bottom of the machining fluid pan 13 through a sixth pipe 32f. The second water tank 36 is connected to the first water tank 31 through a seventh pipe 32g in the middle of which a second pump 37 is arranged, and through a filter 38 connected to the downstream side of the seventh pipe 32g for purifying the polluted water.

Now, operation of the wire cut electric discharge machine will be explained.

When operation of the electric discharge machine is started, the machine body 10 is operated under the control of the control device 20, as known in the art, and the wire 50 is conveyed from the wire feed reel 17 toward the wire recovery box 18 along the wire transport path and simultaneously an electric discharge is produced at the electric discharge machining region.

During the electric discharge machining operation, the machining fluid circulating apparatus 30 is operated under the control of the control device 20. Namely, fresh water as the machining fluid is taken from the first water tank 31 and pressurized by the first pump 33, delivered through the pipes 32a, 32b and 32d and 32e, and injected toward the electric discharge machining region from the upper and lower nozzles 15 and 16. The machining fluid is also delivered through the pipes 32a and 32c and injected toward the worktable 12 and its peripheral parts from the sprinkler 35. At this stage, the valve opening of the flow regulating valve 34 is adjusted in accordance with the type of machining required such, as rough machining, finish machining, and the like. For example, with respect to a rough machining requiring a faster machining speed, the valve opening is decreased, whereas for a finish machining requiring a lower machining speed, the valve opening is increased. Nevertheless, the amount of the water discharged from the first pump 33 is maintained unchanged, regardless of the types of machining. Accordingly, during the rough machining, the amount of fresh water injected from the upper and lower nozzles 15 and 16 is increased while the amount of water injected from the sprinkler 35 is decreased, and during the finish machining, the amount of water injected from the upper and lower nozzles 15 and 16 is decreased while the amount of water injected from the sprinkler 35 is increased.

It is particularly noted that the worktable 12 and its peripheral parts are supplied with the water injected from the sprinkler 35 and also with a considerable part of the water injected from the upper and lower nozzles 15 and 16, and that the discharge quantity of the first pump 33 is maintained unchanged regardless of the types of machining, as mentioned above. Thus, the amount of water supplied to the worktable 12 and its peripheral parts, in other words, the amount of water circulating within the apparatus 30, is maintained substantially unchanged regardless of the types of machining. Accordingly, the amount of water supplied to the worktable 12, etc. varies little during different types of machining types, for example, from rough machining to finish machining. As a result, the worktable 12, etc. undergo substantially no thermal deformation caused by a temperature change thereof due to changes in the quantity of work supplied. As a result, deformation of the workpiece 40 due to the deformation of the worktable 12, etc. is avoided, so that no substantial change occurs in the relative position of the workpiece 40 and the wire 50, namely, no substantial deviation occurs in the electric discharge machining position.

The water supplied to the electric discharge machining region to cool the region and remove the swarf or to cool the worktable 12, etc. becomes polluted. The polluted water is collected in the machining fluid pan 13, and then stored in the second water tank 36 via the sixth pipe 32f. The polluted water is taken by the second pump 37 from the water tank 36, purified by the filter 38, and then returned to the first water tank 31. Accordingly, during electric discharge machining, the water in the water tank 31 is circulated along the aforementioned circulation path.

The present invention is not limited to the above-described embodiment and various modifications are possible. For example, in the above embodiment, an electric flow regulating valve 34 is used, but a manual flow regulating valve may be used instead. Further, although the sprinkler 35 is arranged in the vicinity of the worktable 12, it may be arranged on or close to those component parts of the main body of the electric discharge machine which may be thermally deformed and thus bring about a deviation in the electric discharge machining position, such as the table 11, the upper and lower nozzles 15 and 16, and the like. Furthermore, in the above embodiment, the flow regulating valve 34 is arranged in the third pipe 32c communicating with the sprinkler 35, so that the pressure of the machining fluid injected through the upper and lower nozzles 15 and 16 is maintained at a high level. Alternatively, the flow regulating valve 34 may be arranged in the second pipe 32b communicating with the upper and lower nozzles.

We claim:

1. A machining fluid circulating apparatus for use in a wire cut electric discharge machine in which a machining fluid is injected to an electric discharge machining region between a wire electrode and a workpiece, said machining fluid circulating apparatus comprising:
    injecting means for injecting the machining fluid to a predetermined component part of the electric discharge machine in said electric discharge machining region;
    a tank for storing the machining fluid;
    a first pipe connected to said tank;
    nozzle means in said electric discharge machining region for injecting the machining fluid to said region;
    a second pipe having a first end connected to a downstream side end of said first pipe and a second end connected to said nozzle means;
    a third pipe having a first end connected to the downstream side end of said first pipe and a second end connected to said injection means;
    a pump connected to said first pipe for pressurizing and discharging the machining fluid from said tank; and
    a flow regulating valve connected to either one of said second and third pipes, for adjusting the amount of the machining fluid flowing through either one of said second or third pipes in a manner inversely proportional to each other whereby the amount of machining fluid injected through either said nozzle means or said injection means can be varied in accordance with the type of machining required while still maintaining the total amount of the machining fluid in the apparatus substantially constant to thereby prevent any substantial thermal deformation of said predetermined part.

2. A machining fluid circulating apparatus according to claim 1, wherein said flow regulating valve is connected to said third pipe.

3. A machining fluid circulating apparatus according to claim 1, which further includes:
    a second tank for collecting polluted machining fluid from said electric discharge machining region;
    a fourth pipe connected at one end to said second tank and at its other end to said tank for storing the machining fluid;
    a second pump connected to said fourth pipe for pumping the polluted machining fluid from said second tank; and
    filter means connected to said fourth pipe for purifying the polluted machining fluid prior to the machining fluid being returned to said tank for storing the machining fluid.

4. A machining fluid circulating apparatus according to claim 1, wherein said predetermined component part is arranged to be supplied with the machining fluid injected from said injecting means and at least part of the machining fluid injected from said nozzle.

5. A machining fluid circulating apparatus according to claim 4, wherein said flow regulating valve is connected to said third pipe.

6. A machining fluid circulating apparatus according to claim 4, which includes a worktable, serving as said predetermined component part, for carrying the workpiece thereon, said injecting means being disposed in a facing relation to said worktable.

7. A machining fluid circulating apparatus according to claim 6, wherein said flow regulating valve is connected to said third pipe.

* * * * *

UNITED STATES PATENT AND TRADEMARK OFFICE
CERTIFICATE OF CORRECTION

PATENT NO. : 5,140,124
DATED : August 18, 1992
INVENTOR(S) : TOSHIYUKI ASO and TOYOTADA KAJITORI It is certified that error appears in the above-identified patent and that said Letters Patent is hereby corrected as shown below:

Title Page [75] Inventors: line 2, "Shino" should be

--Yamanashi--;

[87] "Mar. 5, 1990" should be --May 3, 1990--.

Column 4, line 66, "machining types, for example, from rough machining to" should be --machining,--;

line 67, delete "finish machining".

Signed and Sealed this

Ninth Day of November, 1993

Attest:

BRUCE LEHMAN

*Attesting Officer*     *Commissioner of Patents and Trademarks*